(12) United States Patent
Choi et al.

(10) Patent No.: US 7,012,939 B2
(45) Date of Patent: Mar. 14, 2006

(54) WAVELENGTH STABILIZATION MODULE HAVING LIGHT-RECEIVING ELEMENT ARRAY AND METHOD OF MANUFACTURING THE SAME

(75) Inventors: Kwang Seong Choi, Seoul (KR); Heung Woo Park, Seoul (KR); Ho Gyeong Yun, Jeollabuk-Do (KR); Byung Seok Choi, Daejon-Shi (KR); Yong Sung Eom, Daejon-Shi (KR); Jong Hyun Lee, Daejon-Shi (KR); Jong Tae Moon, Jeollabuk-Do (KR)

(73) Assignee: Electronics and Telecommunications Research Institute, Daejon-Shi (KR)

( * ) Notice: Subject to any disclaimer, the term of this patent is extended or adjusted under 35 U.S.C. 154(b) by 225 days.

(21) Appl. No.: 10/648,238

(22) Filed: Aug. 27, 2003

(65) Prior Publication Data

US 2004/0101319 A1 May 27, 2004

(30) Foreign Application Priority Data

Nov. 26, 2002 (JP) ............. 10-2002-0074013

(51) Int. Cl.
*H01S 3/13* (2006.01)
*G01B 9/02* (2006.01)

(52) U.S. Cl. .......................... 372/32; 372/20
(58) Field of Classification Search ............. 372/32
See application file for complete search history.

(56) References Cited

U.S. PATENT DOCUMENTS 5,359,434 A * 10/1994 Nakao et al. ............. 358/481
6,275,317 B1 * 8/2001 Doerr et al. .............. 398/201
6,560,253 B1 * 5/2003 Munks et al. ............. 372/32

FOREIGN PATENT DOCUMENTS

KR 2001-11932 2/2001
KR 2001-27330 4/2001

OTHER PUBLICATIONS

K. Tatsuno, et al.;"50 Ghz spacing, multi-wavelength tunable locker integrated in a transmitter module with a monolithic-modulator and a DFB-laser"; TuB5-1 to Tub5-3.
K.J. Park, et al.;"A Multi-wavelength Locker for WDM System"; WE4-1/73 to WE4-3/75.

* cited by examiner

*Primary Examiner*—James Vannucci
(74) *Attorney, Agent, or Firm*—Mayer, Brown, Rowe & Maw LLP

(57) ABSTRACT

A wavelength stabilization module having a light-receiving element array and a method of manufacturing the same are disclosed. The wavelength stabilization module having a laser diode which irradiates a laser beam at the front side and the rear side thereof comprises a collimator for paralleling the laser beam irradiated at the rear side; a beam splitter for splitting the laser beam passed through the collimator into the two directional laser beams; a light-receiving element for receiving one of the split laser beams; a filter for transmitting a specific wavelength of the other of the split laser beams; a light-receiving element array for receiving the laser beam passed through the filter; and a controller for controlling the output wavelength of the laser diode by using the signals output from the light-receiving element and the light-receiving element array, and the filter and the light-receiving element array are tilted at a predetermined angle with respect to the laser beam and lock the wavelength by using an incident angle dependency of the laser beam passed through the filter.

10 Claims, 5 Drawing Sheets

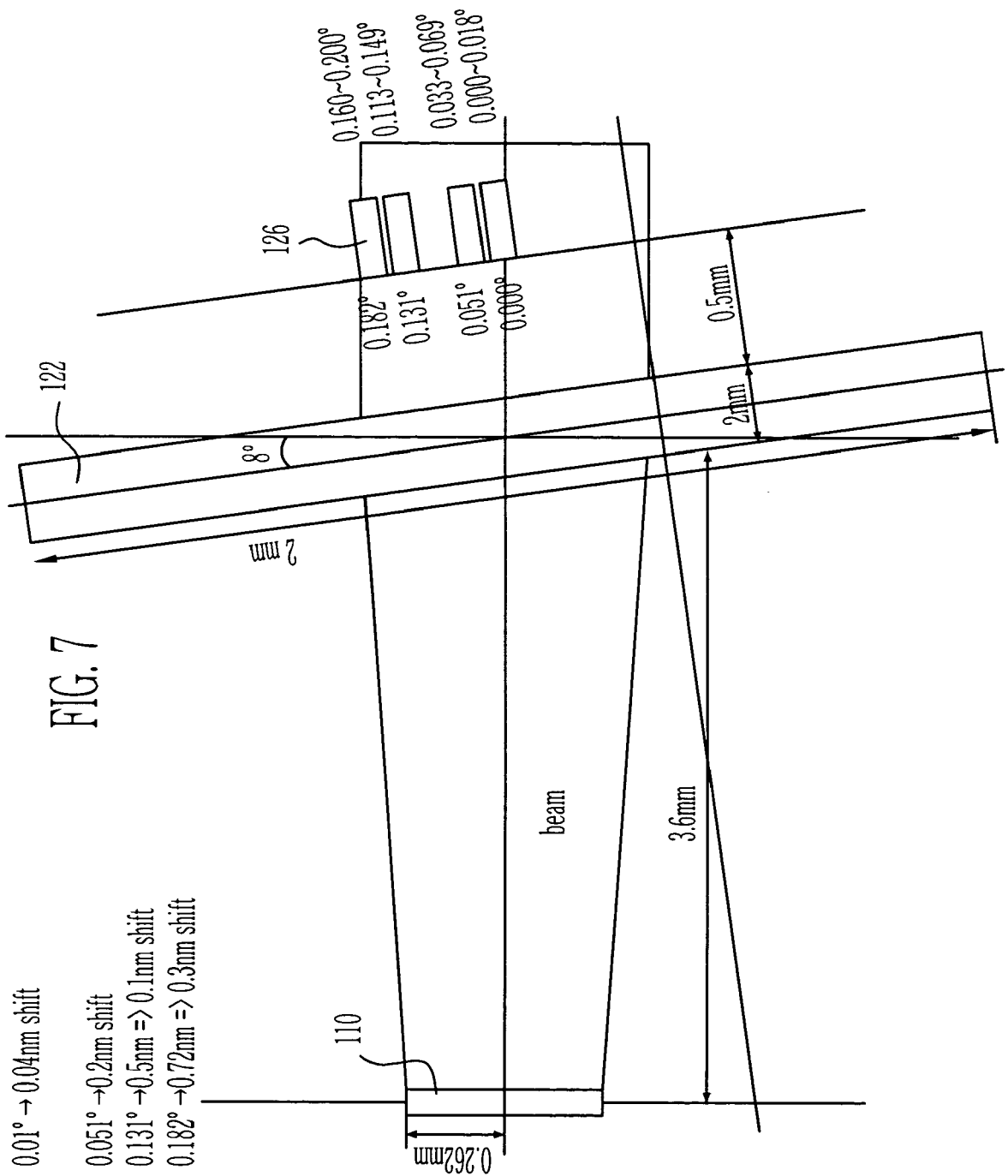

WAVELENGTH STABILIZATION MODULE HAVING LIGHT-RECEIVING ELEMENT ARRAY AND METHOD OF MANUFACTURING THE SAME

BACKGROUND OF THE INVENTION

1. Field of the Invention

The present invention relates to a wavelength stabilization apparatus in a WDM or analog optical communication system, and more particularly, to a wavelength stabilization module having a light-receiving element array which has the dependency of incident angle of a transmission light passing through a F-P filter, to stabilize the wavelength of light output from a laser diode, and a method of manufacturing the same.

2. Description of the Prior Art

In Wavelength Division Multiplexing (WDM) light source module, a multi-functional device has been a world's trend, and the wavelength stabilization function becomes more important in the channel interval of 100 GHz or less. According to this trend, the transceiver module for stabilizing the wavelength becomes one of the most important components in point of view that the structure of the system is simplified so as to increase an economical efficiency and reliability.

Conventionally, to stabilize the wavelength of the transmitted laser beam, various methods such as using a reference absorption gas, a grating, a fiber grating, or a Fabry-Perot (F-P) filter have been used. Among them, efficient and economical means capable of receiving a wide wavelength range in dense WDM (DWDM) having at least several tens of channels is obtained using the F-P filter. The wavelength control precision of wavelength stabilization module developed until recently is approximately 20–50 pm. With this numerical value of the wavelength control precision, the wavelength stabilization module is applicable to the WDM system having channel interval of 100 GHz. However, since most of the modules are external type modules, they have problems in that the systems thereof are complex.

The wavelength stabilization system using the F-P filter has been mainly used in stabilizing the wavelength of a Distributed Feed-Back (DFB) laser diode. As a tuning method for locking the wavelength of the laser diode to the wavelength of an International Telecommunication Union-Telecommunication (ITU-T) grid, several ways have been developed such as the tilting of the angle of an etalon filter, the change of the cavity's length according to the temperature change of the etalon filter, or the change of the mechanical cavity's length according to piezoelectric actuation.

In general, the wavelength of the DFB laser diode is varied by the second method using lie temperature change of the wavelength stabilization module including the etalon filter on a Thermo-Electric Cooler (TEC). The degree of wavelength variation is approximately 0.1 nm/° C., and temperature for stabilizing the wavelength is about 10° C. in 100 GHz-FSR (Free Spectral Range) system. However, when the wavelength tuning function due to the temperature's change is performed in the wavelength stabilization system, the operation condition of the laser diode may be affected, and thus the driving condition of the element becomes very restricted.

In addition, the method of stabilizing the wavelength by tilting the angle of the etalon filter has very high sensitivity in the fine-tilting of the angle. Theoretically, if the wavelength stabilization module is tilted by about 0.01° in an initial state with a rotation of 8° to decrease the reflectivity noise, the wavelength change of about 0.05 nm can be obtained. However, it is difficult for the wavelength stabilization system to be aligned with an accuracy like that, in practical realization, and the yield thereof may be low and the cost thereof is very high.

SUMMARY OF THE INVENTION

Thus, the object of the present invention is to provide a wavelength stabilization module having a light-receiving element array and a method of manufacturing the same which can decrease the reflection noise and can stabilize the wavelength by tilting a filter and a photodiode, while uniformly maintaining the temperature of the system.

In order to accomplish the above-mentioned object of the present invention, a wavelength stabilization module having a laser diode which irradiates a laser beam at the front side and the rear side thereof comprises a collimator for paralleling the laser beam irradiated at the rear side; a beam splitter for splitting the laser beam passed through the collimator into the two directional laser beams; a light-receiving element for receiving one of the split laser beams; a filter for transmitting a specific wavelength of the other of the split laser beams; a light-receiving element array for receiving the laser beam passed through the filter; and a controller for controlling the output wavelength of the laser diode by using the signals output from the light-receiving element and the light-receiving element array, and the filter and the light-receiving element array are tilted at a predetermined angle with respect to the laser beam and lock the wavelength by using an incident angle dependency of the laser beam passed through the filter.

In order to accomplish the above-mentioned object of the present invention, a method of manufacturing the wavelength stabilization module comprises the steps of assembling the laser diode, the collimator, the beam splitter, and the light-receiving element on a TEC; mounting the TEC on a butterfly package; applying an input signal to the laser diode to operate the laser diode; and mounting a sub-mount mounted with the filter and the light-receiving element array at a predetermined angle and a predetermined distance, while monitoring the wavelength of the beam of the laser diode, under controlling the temperature by the TEC.

The present invention relates to a wavelength detection and stabilization apparatus used in a WDM optical communication system or an analog optical communication system, and provides a new module structure and package for stabilizing the wavelength of a multi-channel wavelength variation light source device. In the structure of the wavelength stabilization apparatus, the conventional problems can be overcome by arranging a plurality of light-receiving elements at an appropriate location in a light-receiving section for receiving the light passed through the filter and by using the dependency of incident angle between the light receiving elements. This light-receiving element may be a photodiode, and the filter is preferably an F-P (Fabry-Perot filter).

In the module having the beam splitter, the collimator for collimating a beam, the F-P filter, the monitor photodiode, and the photodiode array at the rear side thereof, the wavelength stabilization function can be implemented in the whole wavelength range by a method of aligning the angles of the F-P filter and the photodiode array block. In case of using the photodiode array, a method of combining and using the outputs of a plurality of photodiodes or one photodiode among a plurality of the photodiodes is used to lock the laser beam with a target frequency. Particularly, F-P filter and a photodiode array are fixed on a sub-mount to be blocked, the wavelength stabilization function satisfying the wavelength interval of the multi-channel WDM communication standard can be provided by using the dependency of incident angle of the transmission light passed through the F-P filter and the photodiode in the photodiode array.

BRIEF DESCRIPTION OF THE DRAWINGS

FIG. 7 illustrates the fine change of an incident angle when the F-P filter and the photodiode array are positioned in the paralleled path of the laser beam.

DESCRIPTION OF PREPERRED EMBODIMENTS

Hereinafter, embodiments of the present invention will be explained with reference to the accompanying drawings. However, the embodiment of the present invention can be changed into a various type, and it should be not understood that the scope of the present invention is limitted to the following embodiments. The embodiments of the present invention are provided to explain the present invention to those skilled in the art.

Figure 1:
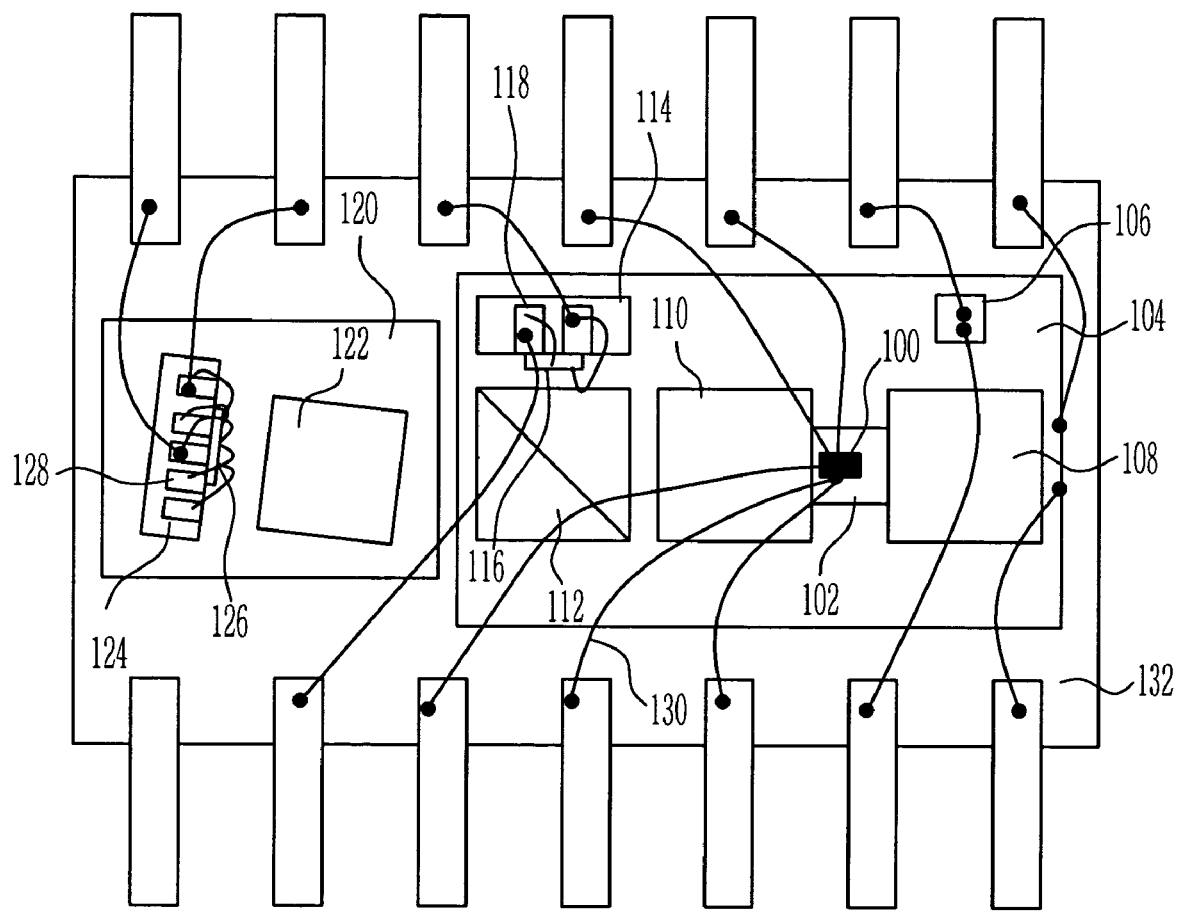
FIG. 1 illustrates the package structure of a wavelength stabilization module having a light-receiving element array according to a preferred embodiment of the present invention.

FIG. 1 illustrates the package structure of a wavelength stabilization module having a light-receiving element array according to a preferred embodiment of the present invention. In a butterfly package 132 having 14 pins, a laser diode (LD) 100 is mounted on a sub-mount 102, and the front side of the laser diode 100 is connected with an external optical fiber through a coupler 108 to transmit the laser beam to the external optical fiber. Also, the laser diode 100 irradiates the beam at the rear side thereof to perform a wavelength stabilization function. The laser beam irradiated at the rear side of the laser diode passes through a collimator 110 so that the laser beam can be transferred to a long distance. The beam passing through the collimator 110 is split into two directional beams by a beam splitter 112. One of the two split beams is transmitted to a photodiode 116 so that the power of the whole laser beam is monitored, and the other of two split beams is transmitted to a F-P filter 122 and a photodiode array 126 so that the wavelength of the laser beam is monitored. The F-P filter 122 functions as a resonator and allows the beam having a wavelength of a certain range to pass and allows the other not to pass.

The components such as the laser diode 100, the collimator 110, the coupler 108, and the beam splitter 112 are positioned on a TEC 104 to maintain the operation temperature of the element to be constant. In order to allow the TEC 104 to maintain the predetermined temperature, the TEC 104 is operated with a thermistor 106. In order to reduce the reflection loss of the laser beam, the F-P filter 122 and the photodiode array 126 are tilted by a certain angle with respect to the propagation direction of the laser beam. Here, the more the angle is increased, the more it is difficult to implement them, and preferably, the tilting angle is in the range of 2° to 10°. Alternatively, if an isolator is used to reduce the reflection loss of the laser beam, the F-P filter 122 and the photodiode array 126 may be not tilted by the certain angle with respect to the propagation direction of the laser beam. While tilting, the tilting angle is preferably 8°, and a sub-mount 102 for the laser diode and a sub-mount 120 for the F-P filter and the photodiode array are used so as to easily perform the tilting operation. Also, a monitor photodiode 116 is may be mounted on the sub-mount 114. The mounted-module is finally connected to each of pad portions on the butterfly package 132 through wires 130.

The wavelength stabilization module according to the present invention can be manufactured by independently modularizing each sub-mount and then mounting the total modules. Alternatively, the wavelength stabilization module according to the present invention can be manufactured by mounting the components such as the laser diode 100, the collimator 110, the coupler 108, the beam splitter 112, and the photodiode array 126 on the total modules, respectively. In the former, a silicon substrate manufactured by a micromachining process is used as the sub-mount. At this time, in order to easily mount each of the components on the silicon sub-mount, a pattern may be formed or a trench may be formed according to the size of the each component, and thereby the arrangement and the assembly thereof can be manually performed.

The approximate sequence of the total module assemble is as follows: First, the sub-mount 102 for the laser diode on which each of the components including the laser diode 100 is assembled is mounted on the TEC 104 and then the TEC 104 is mounted in the butterfly package 132. Then, an input signal is applied to the laser diode 100 to allow the laser diode to be operable. And, the photodiode array block is mounted and arranged, while monitoring the wavelength of the beam output from the rear side thereof under controlling an appropriate temperature. At this time, the photodiode array block is fixed at a desired location, with a certain angle and a certain arrangement distance. When the photodiode array block is mounted, it may be fixed by means of adhesive material such as epoxy, solder, laser welding, or the like.

Figure 2:
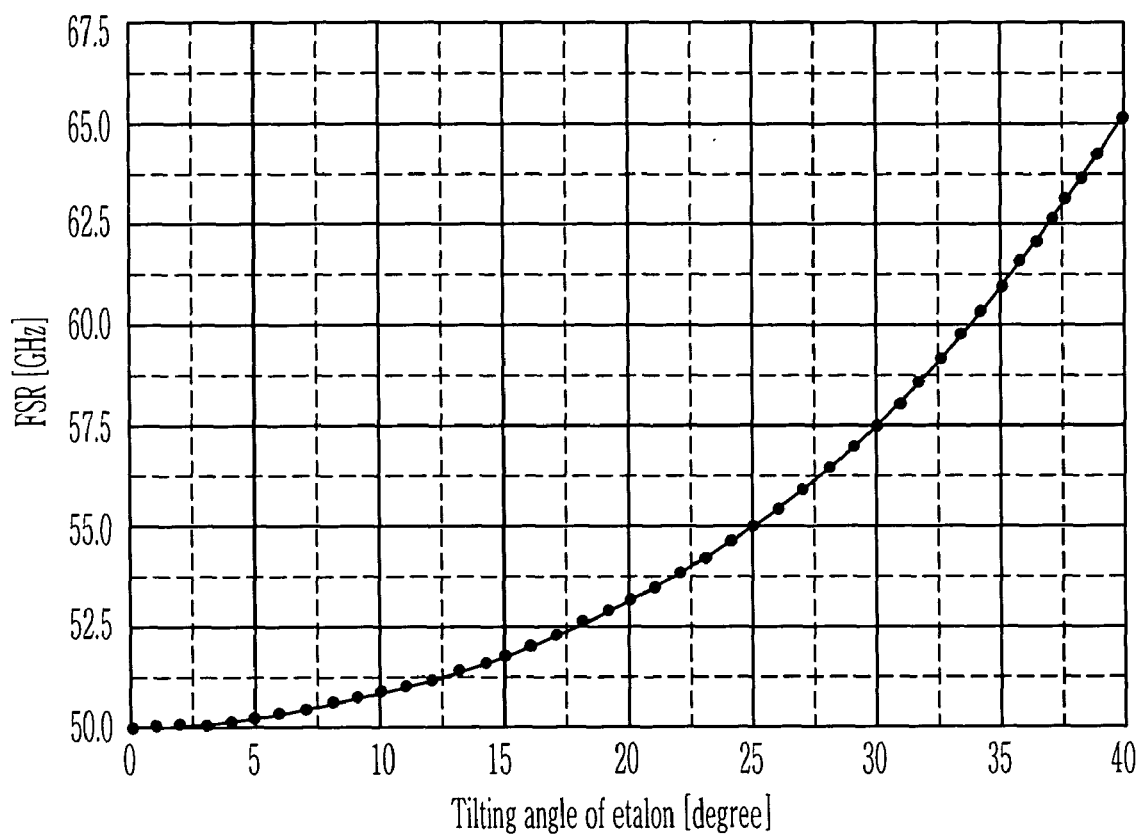
FIG. 2 shows the chang of the FSR when a F-P filter having a 50 GHz FSR is tilted by a certain angle.

FIG. 2 is a graph showing the degree of a FSR variation when the F-P filter having 50 GHz-FSR is tilted by a certain angle. Generally, the F-P filter 122 is manufactured under a condition that the beam is incident in perpendicular to the filter. However, if the F-P filter 122 is tilted to reduce the reflection loss, the FSR value is non-linearly changed according to the tilting angle so that an initial FSR value is changed into a different value. Accordingly, in case the initial tilting angle of F-P filter 122 is set to be 8° as illustrated in one embodiment of the present invention, the desired FSR value needs to be calculated at the time of manufacturing the F-P filter 122. If the F-P filter 122 having 50 GHz-FSR is desired to be manufactured when tilted by 8°, the F-P filter 122 having 49.51–49.52 GHz FSR must be manufactured under the condition that the beam is perpendicularly incident.

Figure 3:
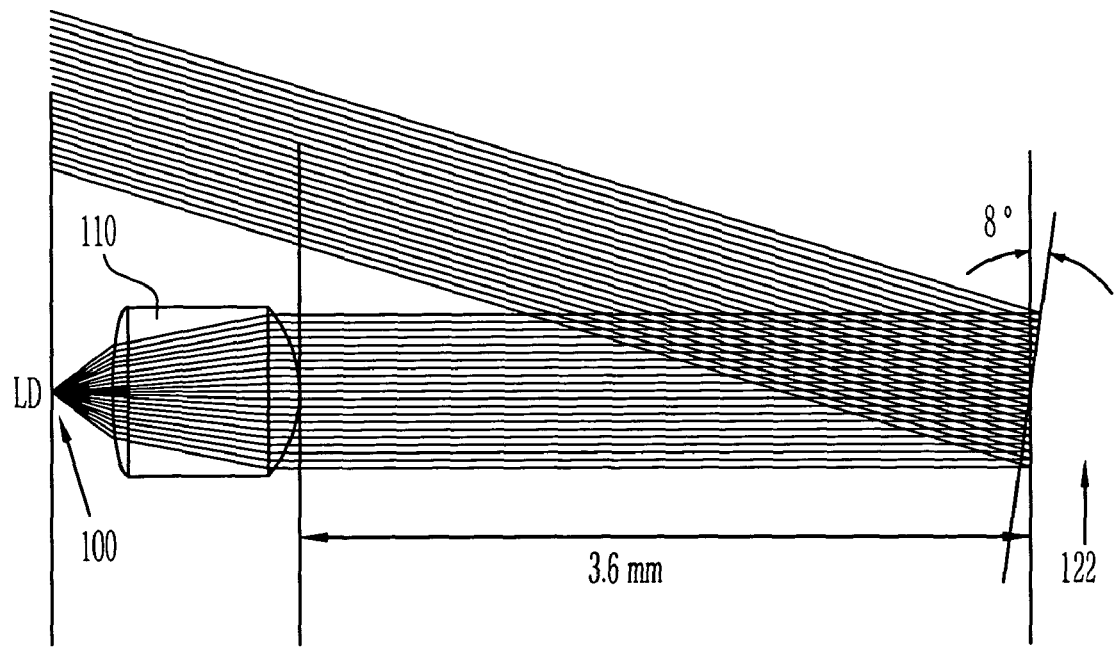
FIG. 3 illustrates the progressed path of the laser beam when the F-P filter is tilted by 8°.

FIG. 3 illustrates the propagation path of the laser beam when the F-P filter is tilted by 8°. The laser diode 100, the collimator 110, and the F-P filter 122 are shown, and the tilting angle was set to be 8° so that the laser beam reflected from the F-P filter 122 reaches the laser diode 100 so as not to generate noises. At this time, the distance between the collimator 110 and the F-P filter 122 is about 3.6 mm. As shown in FIG. 1, according to the simulating results to the propagation path of the beam, it is preferable that the tilting angle is 4° or larger than 4°. However, the tilting angle may be changed in accordance with the distance between the collimator 100 and the F-P filter 122, the parallel degree of the beam of the collimator 110 or the like.

Figure 4A:
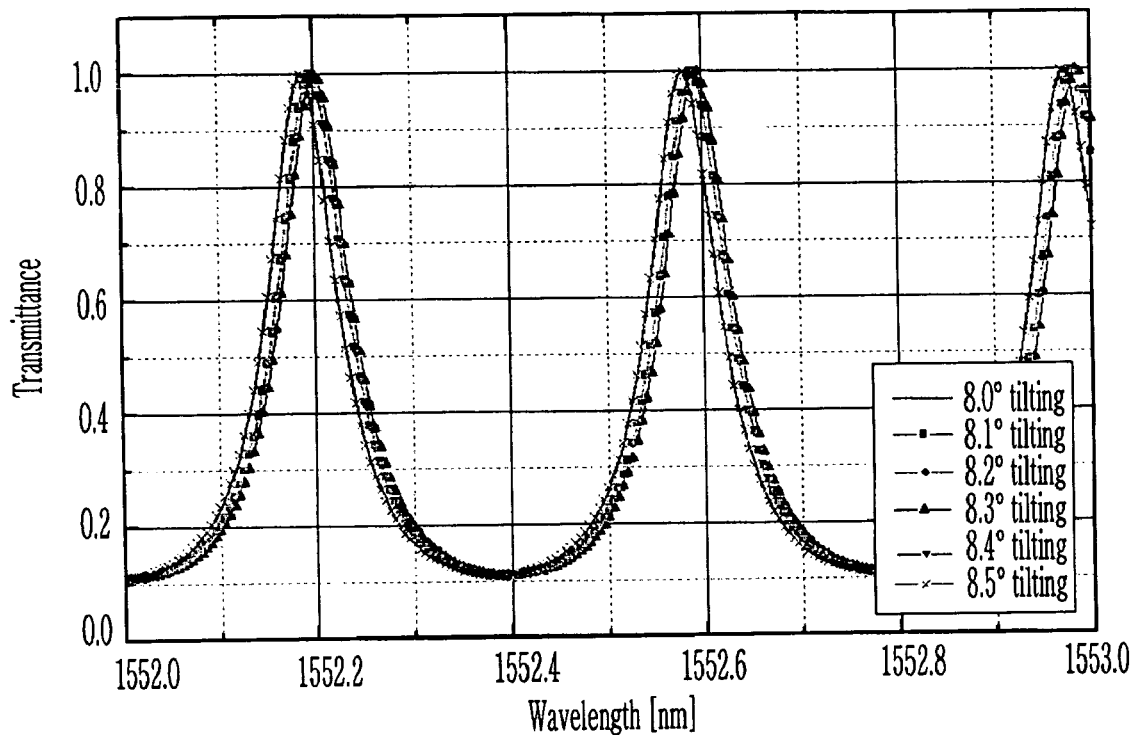
FIGS. 4a and 4b show the fine chang of a wavelength due to the fine error of the wavelength when the F-P filter having 50 GHz FSR is tilted by 8°.
Figure 4B:
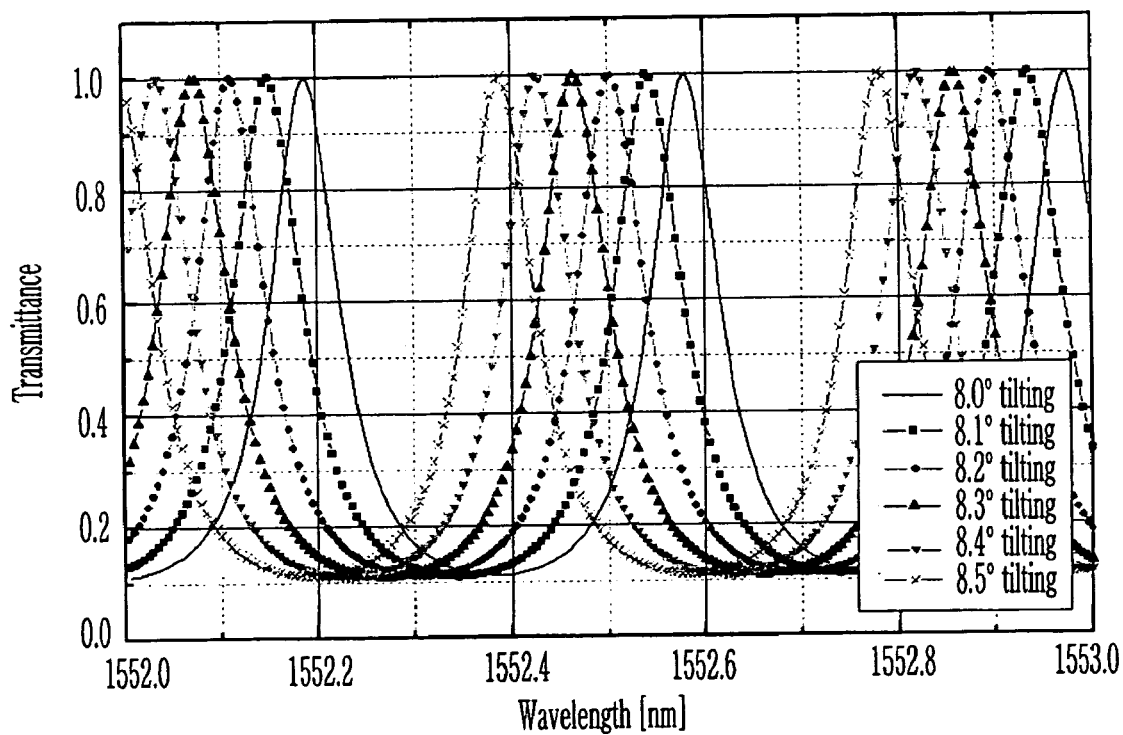

FIGS. 4A and 4B are graphs showing the change of transmittance in wavelength depending on the fine error of F-P filter's tilting. The tilting angle of the F-P filter is adjusted with 8°. FIG. 4A shows the cases that the errors are generated with the intervals of 0.1° at the initial set angle 8°, and FIG. 4B shows the cases that the errors are generated at the intervals of 0.01°. Referring to FIG. 4A, the peak of transmittance in the wavelength was hardly shifted, and, referring to FIG. 4B, the peak of transmittance in the wavelength was shifted by about 0.05 nm. Based on these, the wavelength shifting effect is dominant by tilting the F-P filter 122 at the intervals of 0.01°. That is to say, in case the tilting angle is increased from 8° by 0.01°, the peak of transmittance in the wavelength was shifted toward the short wavelength as shown in FIG. 4B. In case the tilting angle is decreased from 8° by 0.01°, the peak of transmittance in the wavelength was shifted toward the long wavelength by the same interval. This effect can be generated only when the initial tilting angle is 8°. In case the errors are generated with the intervals of 0.1° at the initial set angle 8°, the peak of transmittance is positioned at the location similar to the location of the original wavelength, and thereby the error in the arrangement of the tilted location is low to some extent.

Figure 5:
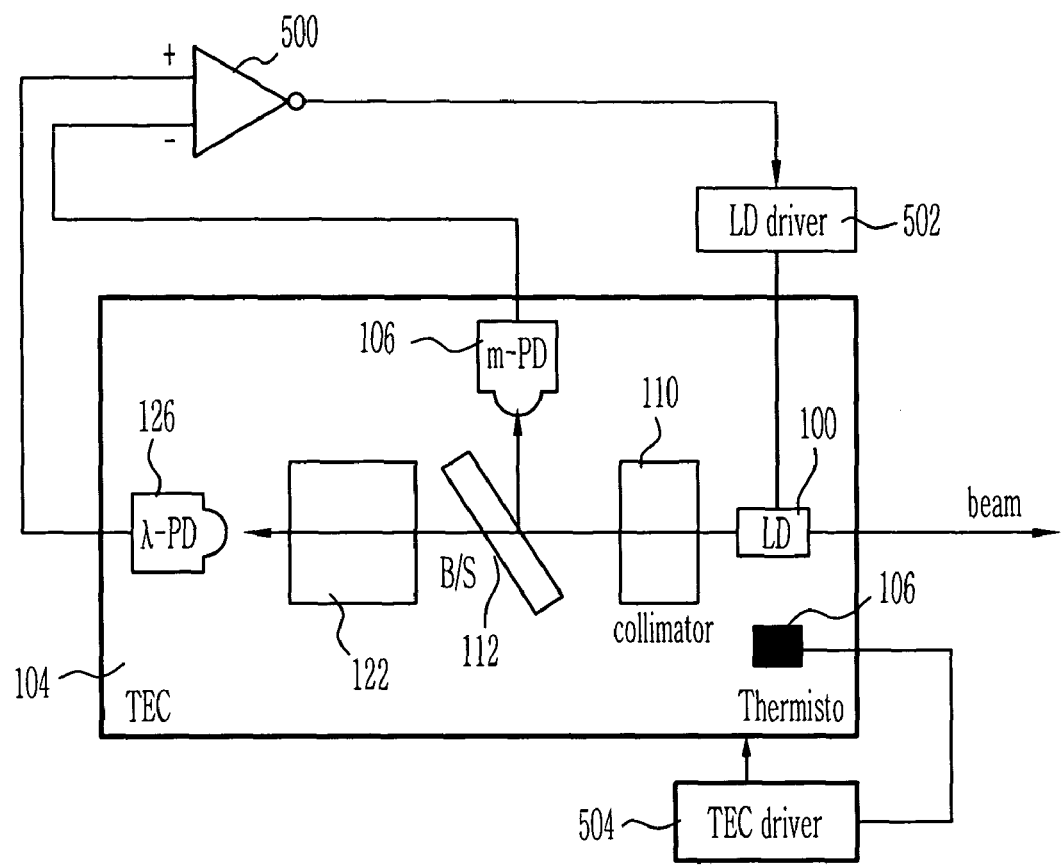
FIG. 5 illustrates the operation of the wavelength stabilization module having the light-receiving element array according to the preferred embodiment of the present invention.

FIG. 5 illustrates the operation of the wavelength stabilization module having the light-receiving element array according to the preferred embodiment of the present invention. The laser diode 100, the collimator 110, the beam splitter 112, the F-P filter 122, and the photodiode 126 are positioned on the TEC 104. In order to drive the laser diode 100 at a constant temperature, the temperature is detected by the thermistor 106, and is always maintained uniform by a TEC driver 504. The laser beam output from the rear side of the laser diode 100 is paralleled by the collimator 110, and then split into the two directional beams by the beam splitter 112. Generally, the beam is split at the ratio of 50:50, but preferably it is split at the ratio of 70:30 in consideration of the strength of the signal. Practically, 30% of the laser beam is directed to the monitor photodiode 106, and 70% thereof passes through the F-P filter 122 to be directed to the photodiode array 126. But, since the loss of about 10% or less is generated in the F-P filter 122, the beam from the photodiode array 126 becomes about 60%. Accordingly, the output of the monitor photodiode 106 becomes a half of the output of the photodiode array 126, and the variable resistance for adjusting the diode's reception sensitivity can be smaller.

A controller 500 monitors the output of the monitor photodiode 106 and the output of the photodiode array 126 and a control signal from the controller 500 is fed back to the input terminal of a laser diode driver 502 to stabilize the output wavelength of the laser diode 100. The controller 500 can be implemented with an operational amplifier, and function as converting the wavelength of the laser diode by calculating the input current due to the error of the output wavelength of the laser diode and inputting it to the laser diode driver.

Figure 6:
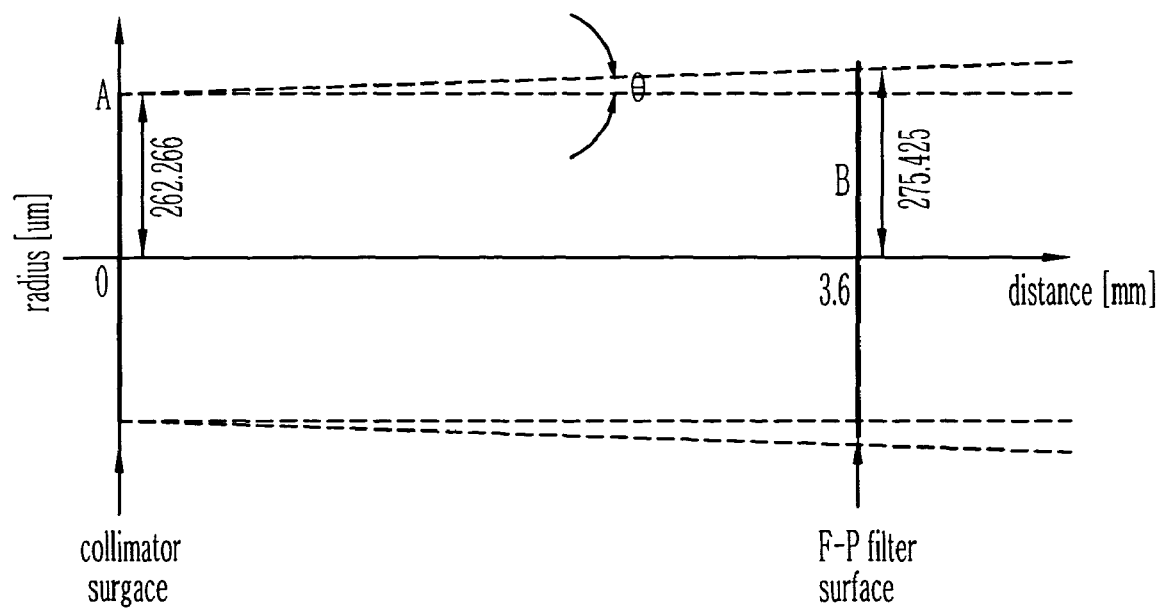
FIG. 6 shows the spread degree of the laser beam passed through a collimator.

FIG. 6 is a graph showing the spread degree of the laser beam passing through a collimator. According to the preferred embodiment of the present invention, the distance between the collimator 110 and the F-P filter 122 is 3.6 mm. In this case, it is noticed that the beam at the surface of the F-P filter 122 is spread by about 13.16 μm. Accordingly, if 13.16 μm is split by 3.6 mm, it is noticed that the spread degree of the beam (θ) is about 0.2°. This result is dependent on the collimator 110, or arranged degree of the focus distance from the collimator 110.

FIG. 7 illustrates the fine change of an incident angle when the F-P filter and the photodiode array are positioned in the parallel path of the laser beam. The laser beam irradiated from the rear side of the laser diode passes through the collimator 110 and the F-P filter 122 to reach the photodiode array 126, and the laser beams received at each photodiode have different angles from each other. In case of using the photodiode array 126, the wavelength variation between the photodiodes can be expected to have about 0.1 nm, as shown in FIG. 7. According to the preferred embodiment of the present invention, it is preferable that all of 4 photodiodes have sizes of 50 μm×200 μm and their intervals are 20 μm, 60 μm, and 20 μm, respectively as the wavelength variation interval between the photodiodes becomes about 0.1 nm due to the angle dependency. One of the 4 photodiodes in the photodiode array block can be located in a desired wavelength, though some error is generated when the photodiode array block is arranged. Accordingly, by using the method suggested in the present invention, the difficulty of wavelength stabilization while tilting the photodiode array lock at the interval of 0.01° can be overcame. Practically, though some arrangement error is generated, one photodiode in the photodiode array 126 can be positioned at a desired location to cover the total wavelength band.

According to the present invention, the wavelength stabilization module for a multi-channel variable wavelength light source, which can be used in a WDM application having a dense wavelength interval, can be manufactured. It is accomplished through the fine wavelength variation effect due to the fine change of the incident angle of the transmission light passing through the filter by using the photodiode array and the filter tilted by the certain angle with respect to the direction of the laser beam. In addition, the wavelength of the laser beam can be locked to a desired wavelength channel at a certain temperature by using the TEC, without changing the operation temperature of the laser diode, and low cost and high yield can be accomplished.

Although the present invention has been illustrated and described with respect to exemplary embodiments thereof, the present invention should not be understood as limited to a specific embodiment, and it should be understood by those skilled in the art that the foregoing and various other changes, omission and additions may be made therein and thereto, without departing from the spirit and scope of the present invention.

What is claimed is:

1. A wavelength stabilization module having a laser diode which irradiates a laser beam at the front side and the rear side thereof, the module comprising:
   a collimator for paralleling the laser beam irradiated at the rear side;
   a beam splitter for splitting the laser beam passing through the collimator into two directional laser beams;
   a light-receiving element for receiving one of the split laser beams;
   a filter for transmitting a specific wavelength of an other of the split laser beams;
   a light-receiving element array for receiving the laser beam passing through the filter; and a controller for controlling the output wavelength of the laser diode using the signals output from the light-receiving element and the light-receiving element array, wherein the filter and the light-receiving element array are tilted at a predetermined angle with respect to the laser beam and lock the wavelength using an incident angle dependency of the laser beam passing through the filter, and the light-receiving element array comprises a plurality of elements that detect different wavelengths.

2. The wavelength stabilization module according to claim 1, wherein the filter and the light-receiving element array are fixed on a sub-mount and are blocked.

3. The wavelength stabilization module according to claim 1, further comprising a TEC (Thermo-Electric Cooler), wherein the TEC comprises a thermistor for detecting the temperature and a TEC driver for receiving and maintaining uniform the temperature detected in the thermistor.

4. The wavelength stabilization module according to claim 1, wherein the predetermined angle is in the range of 2° to 10°.

5. The wavelength stabilization module according to claim 1, wherein the beam splitter splits the laser beam passing through the collimator so that some portion thereof is directed to the light-receiving element and some portion thereof is directed to the filter.

6. The wavelength stabilization module according to claim 1, wherein the light-receiving element array comprises four light-receiving elements, and the light-receiving elements are positioned at certain intervals.

7. The wavelength stabilization module according to claim 1, wherein the controller includes an operation amplifier and a laser diode driver.

8. A method of manufacturing a wavelength stabilization module, the method comprising:

assembling a laser diode, a collimator, a beam splitter, and a light-receiving element on a TEC;

mounting the TEC on a butterfly package;

applying an input signal to the laser diode to operate; and mounting a sub-mount mounted with the filter and a light-receiving element array at a predetermined angle and a predetermined distance, while monitoring the wavelength of the beam of the laser diode, under the temperature controlled by the TEC, wherein the light-receiving element array comprises a plurality of elements that detect different wavelengths.

9. The method according to claim 8, wherein the sub-mount mounted with the filter and the light-receiving element array use a silicon substrate and are manufactured with a micro-machining process.

10. The method according to claim 9, wherein a pattern or a trench is formed in the sub-mount and the filter and the light-receiving element array are mounted therein.

* * * * *